Patented Nov. 28, 1922.

1,436,940

UNITED STATES PATENT OFFICE.

HYYM E. BUC, OF ROSELLE, NEW JERSEY, ASSIGNOR, BY MESNE ASSIGNMENTS, TO STANDARD DEVELOPMENT COMPANY, OF NEW YORK, N. Y., A CORPORATION OF DELAWARE.

SEPARATION OF CHLORACETONES.

No Drawing. Application filed November 4, 1920. Serial No. 421,728.

*To all whom it may concern:*

Be it known that I, HYYM E. BUC, a citizen of the United States, residing at Roselle, in the county of Union and State of New Jersey, have invented a new and useful Improvement in the Separation of Chloracetones, of which the following is a specification.

The present invention relates to the separation of individual chlorinated acetones containing two or more chlorine atoms and will be clearly understood from the following description thereof.

In my copending application Serial No. 421,730, filed of even date herewith, I have described the formation of chlorinated acetones from isopropyl alcohol by subjecting isopropyl alcohol, in the presence or absence of water, to the action of chlorine in excess while maintaining a temperature between 35 and 70° C., and preferably of about 65° C. The liquid products of reaction separate into two layers; a heavy, lower layer containing chiefly chlorinated acetones and a supernatant layer containing chlorinated acetones in solution. The chlorinated products may be removed from the solution by "salting out", that is, by the addition of a soluble inorganic compound, such as NaCl or CaCl₂ thereto. The vapor products of reaction may be passed through absorbers containing water. In the absorbers a heavy, oily, layer containing chlorinated acetones separates, and the dissolved chlorinated acetones in the supernatant aqueous layer may be separated by "salting out". The several bodies of chlorinated acetones thus obtained contain dichloracetone (asym.), trichloracetone (such as 1. 3. 3), tetrachloracetone, (sym.) and pentachloracetone, and may be combined for treatment as hereinafter described or may be separately subjected to treatment.

When combined the mixture is found to consist chiefly of di- and tri-chloracetones (such as 1. 3. 3) with smaller, varying proportions of tetra- and penta-chloracetones, and there may be associated with it from 10 to 20% of chlorinated hydrocarbons, a practical separation of which may be effected by fractionally distilling off that portion boiling below 118° C., the boiling point of asym. dichloracetone, said portion containing the major portion of chlor-hydrocarbons.

In order to separate the individual chloracetones from such mixture, the mixture to be treated is first extracted with water. Several extractions are advisable for complete separation; for example, three extractions each with a volume of water equal to that of the mixture treated. The aqueous liquid separated contains principally the trichloracetone (such as 1. 3. 3) and symmetrical tetrachloracetone, the former of which is miscible with water in all proportions and the latter appears to form a hydrate which is soluble in three to four times its volume of water.

The tri- and tetrachloracetones may be separated from the water of the aqueous solution by "salting out", for example, with NaCl, CaCl₂, HCl, or equivalent inorganic compound. The separated tri- (such as 1. 3. 3) and tetrachloracetones may then be separated by fractional distillation. The boiling point of the trichloracetone (such as 1. 3. 3) is about 170° C. and that of the tetrachloracetone is about 182° C.

After extraction of the mixture of chloracetones with water, the residue, comprising chiefly dichloracetone and pentachloracetone, is extracted with an aqueous solution of sodium bisulfite ($NaHSO_3$). The dichloracetone is dissolved thereby and the pentachloracetone remains undissolved. The dichloracetone may be recovered from the solution by decomposing the compound formed by it with the $NaHSO_3$, this being readily effected, for example, by adding an acid such as $H_2SO_4$ or by heating gently under a reflux condenser, thereby driving off $SO_2$ and liberating the dichloracetone.

The pentachloracetone may be directly separated from a mixture containing it, together with all the other chloracetones, by extracting the mixture with a solution of $NaHSO_3$, as above described, the pentachloracetone being thereby left as a residue.

Although the present invention has been described in connection with a detail of specific means for carrying it out, it is not intended that these shall be regarded as limitations upon the scope of the invention, except in so far as included in the accompanying claims.

I claim:

1. The process of separating the components of a mixture of di, tri, tetra and penta chloracetones which consists in extracting the mixture with water, thereby forming an aqueous solution principally of the tri and tetra chloracetones, separating the aqueous solution from the residue, "salting out" the chloracetones from the said solution, fractionating the separated chloracetones, extracting the residue above mentioned with an aqueous solution of $NaHSO_3$, thereby dissolving the dichloracetone and decomposing the solution of dichloracetone to remove the latter therefrom.

2. The process of separating tri and tetrachloracetone from a mixture of chlorinated acetones, comprising adding water to the mixture and separating the water solution principally of tri and tetrachloracetones from the undissolved chloracetones.

3. The process of separating tri and tetrachloracetone from a mixture of chlorinated acetones, comprising adding water to the mixture, separating the water solution principally of tri and tetrachloracetones from the undissolved chloracetones, and throwing out of solution the tri and tetra-chloracetones dissolved therein by adding a salt to said water solution, and separating the tri and tetrachloracetones from the water.

4. The process of separating tri and tetrachloracetone from a mixture of chlorinated acetones, comprising adding water to the mixture, separating the water solution principally of tri and tetrachloracetones from the undissolved chloracetones, and throwing out of solution the tri and tetrachloracetones dissolved therein by adding a salt to said water solution, separating the tri and tetrachloracetones from the water and fractionating the mixture of tri and tetrachloracetones to recover each individually.

5. In the process of separating the components of a mixture of chloracetones including pentachloracetone, the steps which consist in subjecting the mixture to the action of an aqueous solution of $NaHSO_3$, whereby the pentachloracetone is left as a residue.

HYYM E. BUC.